United States Patent [19]

Pfeiffer

[11] 4,152,847
[45] May 8, 1979

[54] METHOD AND DEVICE FOR TEACHING THE COMPARATIVE MEASUREMENT OF HEAT FLOW

[76] Inventor: Carl H. Pfeiffer, 1355 Hommen Rd., Rte. 1, Deerfield, Wis. 53531

[21] Appl. No.: 869,048

[22] Filed: Jan. 13, 1978

[51] Int. Cl.² ............................................ G09B 23/16
[52] U.S. Cl. ........................................ 35/19 R; 35/50
[58] Field of Search ............................ 35/19 R, 50, 10

[56] References Cited

U.S. PATENT DOCUMENTS

| | | | |
|---|---|---|---|
| 1,975,052 | 9/1934 | Roos | 35/19 R |
| 2,172,229 | 9/1939 | Waldo | 35/19 R |
| 2,272,245 | 2/1942 | Kuck | 35/19 R |
| 2,296,815 | 9/1942 | Evans | 35/19 R |
| 2,326,194 | 8/1943 | Barton | 35/19 R |
| 2,745,195 | 5/1956 | Gombert | 35/50 |

OTHER PUBLICATIONS

Leslie's Cube, item 61-100, p. 206 of L. E. Knott Apparatus Co. Catalog for 1916.
Radiation Heat Box, item 41815, p. 156 of Stansi Scientific Division Catalog, Rec'd. Feb. 1969.

*Primary Examiner*—Harland S. Skogquist

*Attorney, Agent, or Firm*—Theodore J. Long; Harry C. Engstrom; Nicholas J. Seay

[57] ABSTRACT

A method and device for teaching the comparative measurement of heat flow through and into selected sample materials. The device includes a container constructed of relatively low heat conductive material and adapted to be partitioned into at least two identical chambers. Means for holding sample materials, filling the identical chambers with insulation, covering the container, heating one chamber of the container, measuring the temperature in the identical chambers, and other means for adapting the device for selected investigations are removably received within the container, making the teaching device flexibly adaptable to a variety of teaching uses. The method for teaching the comparative measurement of heat flow through and into selected materials includes exposing at least one heat receiver to a selected source of radiant energy under selected conditions. The temperature rise in the heat receiver is an indication of the intensity of the energy source and the heat transmitting properties of any sample materials positioned between the energy source and the heat receiver.

23 Claims, 24 Drawing Figures

METHOD AND DEVICE FOR TEACHING THE COMPARATIVE MEASUREMENT OF HEAT FLOW

BACKGROUND OF THE INVENTION

1. Field of the Invention

This invention pertains generally to teaching devices designed for use at the elementary and secondary school level, and more particularly to such devices specifically designed to facilitate investigations of phenomena associated with the heat transmitting properties of various materials and with the nature of solar radiation at the earth's surface.

2. Description of the Prior Art

The art of measuring heat flow and the intensity of radiant energy is well established. Various devices have been developed specifically to facilitate investigations in these areas and are described in the patent literature. Examples of such U.S. patents are a precision type of isothermal calorimeter, Jackson, et al. U.S. Pat. No. 2,733,602, 1956; a continuous flow, steady state calorimeter, Oliver, U.S. Pat. No. 2,800,793, 1957; a precision power comparing calorimeter, Czerlinsky, et al., U.S. Pat. No. 2,911,824, 1959; a thermal emissivity device, Dudley, et al., U.S. Pat. No. 3,142,983, 1964; a calorimeter apparatus for measuring high intensity radiation, Soffer, et al., U.S. Pat. No. 3,483,747, 1969; and a heat sensor measuring device, Progelhof, et al., U.S. Pat. No. 3,605,490, 1971. These devices have been developed to perform specialized functions and in response to specific needs for greater precision. They are designed for use by skilled scientists and are too specialized, technically sophisticated, and expensive to be useful as teaching devices at the elementary and secondary school levels.

The need for a practical device for teaching the measurement of heat flow is increasing as schools respond to the importance of developing a better understanding of the nature of energy and the use of energy as an economic good. In particular, there is a need for students to understand the heat transmitting properties of the various materials and devices which are common to their energy use experiences. More than a matter of pure science, this knowledge is important to a student's ability to understand and constructively respond to the pressures caused by the depletion of national energy supplies and the opportunity represented by the developing use of solar energy.

SUMMARY OF THE INVENTION

I have invented a method and device for measuring the transmittance of heat through and into materials in a manner suitable for use in teaching primary and secondary school students. In order to make my device especially practical and valuable for teaching, it is designed to be versatile and may be assembled in any of a variety of modes adapted to measure heat flow under various conditions into or between different parts of the device. My teaching device includes an open-topped container constructed of relatively low heat conductive material having means for locating an internal partition therein. At least one partition of selected heat conductivity is engageable with the partition locating means in removable relation. When located in the open-topped container, the partition divides the container into a variable chamber and a substantially identical control chamber. My device further includes means for measuring the temperature within each of the identical chambers.

My method for teaching the comparative measurement of heat flow includes exposing at least one heat receiver to a selected source of radiant energy under selected conditions. The temperature rise in the heat receiver is an indication of the intensity of the energy source and the heat transmitting properties of any sample materials positioned between the energy source and the heat receiver. When the radiant energy source used is the sun, at least one collimating tube may be used to subject at least one selected heat receiver to the parallel rays of the sun while screening it from most scattered solar radiation.

A primary object of my invention is to provide a method and device simple enough to be easily understood and used by elementary and secondary school children for measuring the transmittance of heat through and into materials. To achieve this object it is desirable that the teaching device be physically simple and designed to avoid the need to incorporate delicate equipment or materials in its construction. The method for measuring the transmittance of heat into and through materials should be so designed that the relationship between the steps of the method and the particular investigative goal intended is obvious and direct.

A second object of my invention is to provide a teaching device sufficiently versatile that a school may economically expand the range of investigations it is equipped to have its students perform without the need to purchase many new pieces of equipment.

Another object of my invention is to provide a means for schools to expand the number of investigations its students may perform without the necessity of devoting excessive storage space to the necessary equipment.

A further object of my invention is to provide a method and teaching device with which secondary and primary school students can perform investigations which will increase their insight into the heat transmitting properties of materials the use of which is important in the conservation of energy.

Another object of my invention is to provide a method and teaching device whereby students may learn about the nature of solar radiation as a potential energy source.

Other objects, features and advantages of my invention will be apparent from the following detailed description taken in conjunction with the accompanying drawings.

DESCRIPTION OF THE PREFERRED EMBODIMENT

Figure 1:
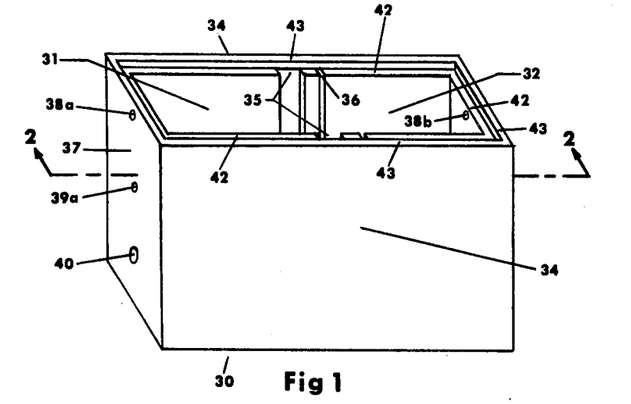
FIG. 1 is a perspective view of the basic thermal transimeter unit of my invention.

Referring now more particularly to the drawings, wherein like numerals refer to like parts, FIG. 1 shows the preferred embodiment of my teaching device. The basic thermal transimeter unit 30 comprises a rectangular container constructed of wood, plastic, or other material of relatively low heat conductivity. A material of high heat conductivity would provide an undesirable path for heat flow within the thermal transimeter. The rectangular container is capable of being divided into two similar chambers, a control chamber 31 and a variable chamber 32.

Figure 2:
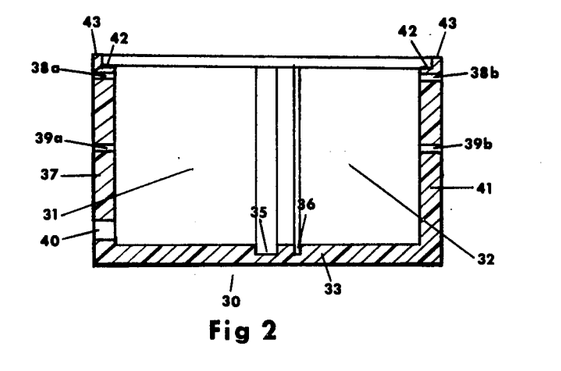
FIG. 2 is a cross sectional view of the basic thermal transimeter unit taken along section line 2—2 of FIG. 1.

The base 33 of the basic thermal transimeter unit 30, shown in FIG. 2, and the two opposing sides 34, shown in FIG. 1, have a wide channel cutting across their surfaces perpendicular to their length and equidistant from their ends forming a continuous, U-shaped channel 35 geometrically centered within the basic thermal transimeter unit 30. A narrow channel 36, also continuous between the base 33 and both sides 34, is located parallel to and on the variable chamber 32 side of the wide channel 35. Together and individually, channels 35 and 36 act as a means for locating an internal partition in the unit 30, although a bracket or other type of fastening could also be used. The control chamber end wall 37 has an upper thermometer insert port 38a, a lower thermometer insert port 39a, and a vent port 40 which provides passage for air flow into and out of the control chamber 31. The variable chamber end wall 41 has an upper thermometer insert port 38b and a lower thermometer insert port 39b located in positions that precisely correspond to those of the upper and lower thermometer insert ports 38a and 39a in the control chamber end wall 37. The interior top edge surfaces of the vertical sections of the basic thermal transimeter unit are recessed providing a horizontal support surface 42 contiguous to the flanged top 43 of the basic thermal transimeter unit 30.

Figures 3, 4, 5:
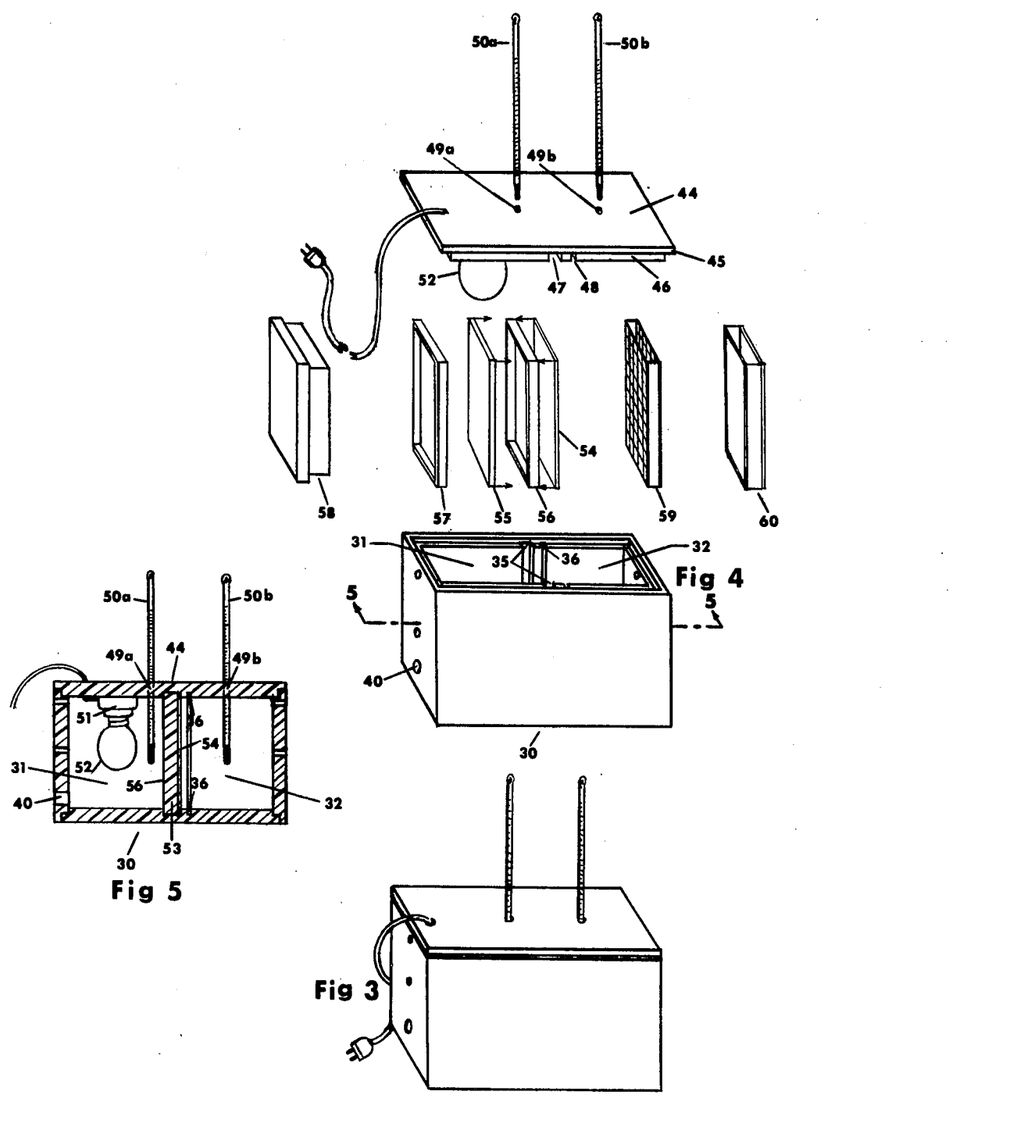
FIG. 3 is a perspective view of my thermal transimeter unit modified for measurement of the heat transmitting properties of selected materials in response to a controlled radiant energy input.
FIG. 4 is a perspective view of my basic thermal transimeter unit with the accessory components utilized in the modification illustrated in FIG. 3 shown separated in vertically exploded relation.
FIG. 5 is a cross sectional view taken along section line 5—5 of FIG. 4.

FIG. 3 shows a perspective view of the basic thermal transimeter unit 30 modified to investigate the heat transmitting properties of various materials when subjected to a controlled quantity of radiant energy. The basic thermal transimeter unit 30 and the accessory components utilized in this modification are shown separated in the exploded view of FIG. 4. When used to investigate the heat transmitting properties of various materials subjected to a controlled quantity of radiant energy, the basic thermal transimeter unit is used in combination with a rigid cover 44. The cover 44 has a flanged perimeter 45 such that the under side of the cover and the bottom surface of the cover flange 45 are in continuous contact with the horizontal support surface 42 and the top flange surface 43 respectively of the basic thermal transimeter unit when the cover 44 is in place. A wide channel 47 and a narrow channel 48 run perpendicular to the length and across the bottom surface of the cover 44 and are respectively continuous with the wide channel 35 and narrow channel 36 of the basic thermal transimeter unit 30 when the cover 44 is in place. Two thermometer insert ports 49a and 49b permit the insertion of thermometers 50a and 50b into the control chamber 31 and the variable chamber 32. Suspended from the bottom surface of the cover 44 is a means for heating the control chamber 31, preferably an incandescent lamp socket 51 and lamp 52 positioned so that the lamp is geometrically centered in the control chamber 31 when the cover is in place. Alternatively, a resistance coil or other heater may be used as the heating source.

Materials to be investigated are inserted into the wide channel 35 of the basic thermal transimeter unit 30 thereby providing a vertical thermal barrier 53, shown in FIG. 5, which also constitutes a partition separating the control chamber 31 from the variable chamber 32. Rigid materials 54 and 55 thinner than the wide channel can be stabilized in the vertical thermal barrier position 53 by use of sample spacers 56 or 57. Rigid thin walled materials may be investigated singly, in combinations of two samples on the same side of the sample spacer 57, or on opposite sides of the sample spacer 57 with an intervening enclosed air space. Three thin walled rigid samples may be investigated in combination with two, equally spaced, intervening enclosed air spaces by separating two of the samples with the narrow sample spacer 57 and inserting the third sample into the narrow channel 36 of the basic thermal transimeter unit. Rigid materials with thicknesses up to two inches, typically 58 shown in FIG. 4, are accommodated by reducing the perimeter of the sample to a thickness equal to that of the wide channel 35. Nonrigid solids can be investigated by utilizing the gridded sample holder 59 to contain the material in the thermal barrier position 53. The gridded sample holder 59 includes two rigid parallel grids and a frame engaging the two rigid grids in spaced relation and substantially closing the margins of the space between them to retain a nonrigid, solid sample therebetween. Heat transmitting properties of fluids are investigated by comparing the rate of thermal energy transfer by the fluid sample holder 60 while containing air, to the rate of transfer when the air is replaced by various fluids. The fluid sample holder 60 comprises two rigid fluid-impermeable, parallel sides and a frame engaging the two sides in spaced relation and substantially closing the margins of the space between them to retain a fluid sample therebetween.

My preferred method for utilizing the thermal transimeter modified for investigating the heat transmitting properties of various materials is first to place a partition composed of a sample of the material to be investigated in the thermal barrier position 53. Then means for measuring temperature such as thermocouples or thermometers 50a and 50b are inserted through the insert ports 49a and 49b in the cover 44 into the control chamber 31 and the variable chamber 32 respectively. Then the incandescent lamp 52 is energized and the temperature of the air contained in the control chamber is allowed to increase from the ambient temperature to 100° C. With each ten degree increment of temperature rise from 30° C. to 100° C. experienced in the control chamber, the temperature within the variable chamber is noted. Then the incandescent lamp is switched off, the cover is removed, and the thermal transimeter and accessory components are allowed to cool to a temperature of 30° C. before the procedure is repeated with another sample. Since the only variables in successive trials with various materials are differences in the heat transmitting properties of the materials being investigated, the temperature measurements provide a basis for comparing the heat transmitting properties of the materials.

The basic thermal transimeter modified to accommodate these procedures provides a convenient and economical device for investigating a wide range of phenomena associated with thermal energy transfer, such as rates of thermal energy transfer through specific metals and through insulating materials of all types and forms, the relationship between the thickness of an insulating material and its ability to reduce thermal energy losses, thermal energy transfer properties of various liquids and gases, and thermal energy transfer properties of various systems which embody more than one kind or state of matter such as double and triple glazed windows. Activities can also be designed which focus attention on the economics associated with the use of such materials and systems. Finally, it is also possible to illustrate basic concepts associated with thermal energy, such as the difference between temperature and heat and fundamental ideas associated with the laws of thermodynamics.

Figures 6, 7, 8, 9, 10:
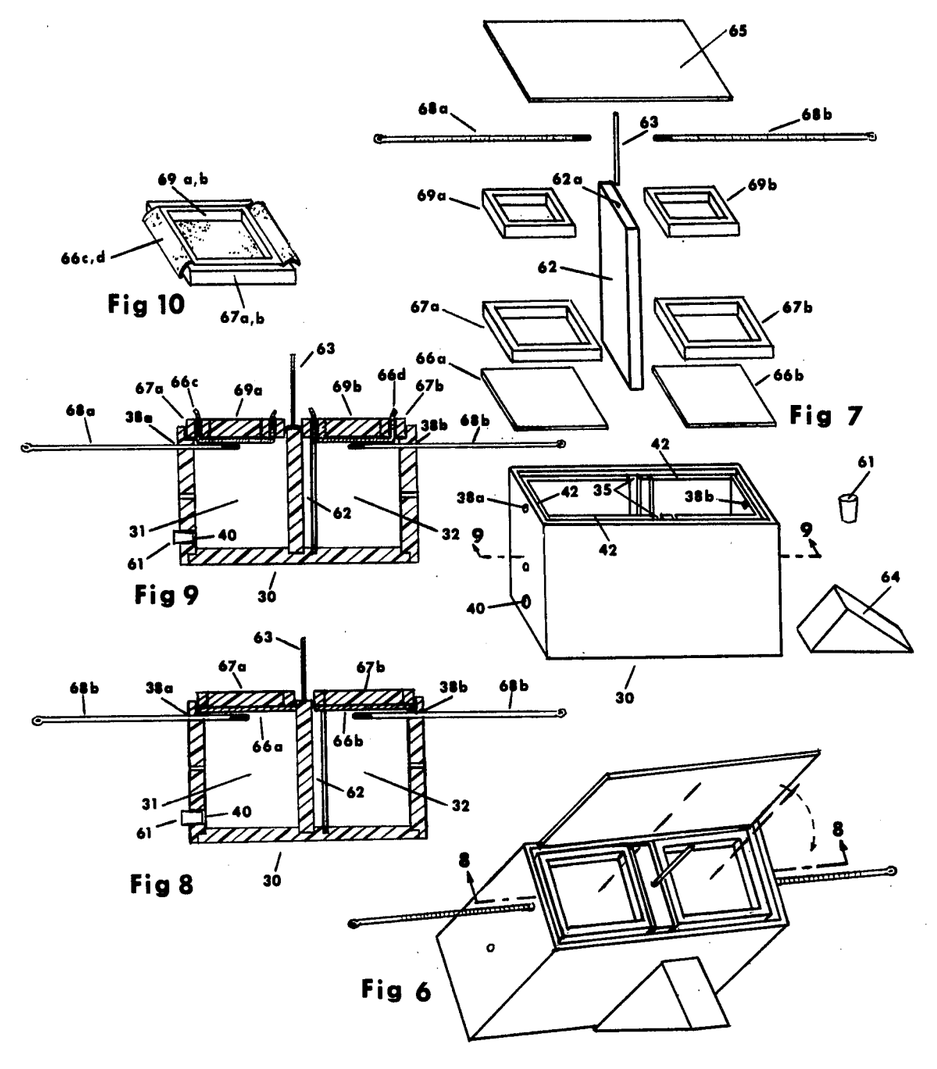
FIG. 6 is a perspective view of my thermal transimeter unit modified to measure the heat transmitting properties of selected materials in response to direct solar radiation.
FIG. 7 is a perspective view of my basic thermal transimeter unit with the accessory components utilized in the modification illustrated in FIG. 6 shown separated in vertically exploded relation.
FIG. 8 is a cross sectional view taken along section line 8—8 of FIG. 6.
FIG. 9 is a cross sectional view taken along section line 9—9 of FIG. 7.
FIG. 10 is a perspective view of the sample holding device used to position various types of fabrics in my thermal transimeter as shown in FIG. 9.

FIG. 6 is a perspective view of the basic thermal transimeter unit 30 modified to investigate the heat transmitting properties of various materials subjected to direct solar radiation. The basic thermal transimeter and the accessory components utilized in this modification are shown separately in the exploded view of FIG. 7. When investigating the heat transmitting properties of materials subjected to direct solar radiation, the vent port 40 in the basic thermal transimeter is closed with a rubber stopper 61 and a rigid thermal barrier 62 is inserted into the center channel 35 as a partition forming two substantially identical chambers 31 and 32. An orienting means, such as the collimating guide rod 63 shown inserted into a small aperature 62a in the top surface of the rigid thermal barrier 62, is used in conjunction with the angular displacement block 64 to establish and maintain the desired orientation of the thermal transimeter with respect to the incident solar radiation. A sun screen 65 selectively shades the thermal transimeter from the direct rays of the sun. Means for selectively covering the open tops of the identical chambers comprise rigid test samples 66a and 66b positioned so that they cover the identical chambers, with the edges of the samples in contact with the horizontal support surfaces 42 of the basic thermal transimeter 30. The test samples are held in place by sample holding frames 67a and 67b best shown in FIG. 8. Fabric samples 66c and 66d are engaged and held under slight tension by the nesting of the fabric sample holders 69a and 69b within the sample holding frames 67a and 67b, as best shown in FIG. 10. Thermometers 68a and 68b are inserted through the upper thermometer insert ports 38a and 38b and positioned so that the mercury reservoir is geometrically centered directly beneath the test samples.

The thermal transimeter thus modified may be used to investigate the heat transmitting properties of sample materials subjected to normal incident solar radiation or to radiation impinging on a horizontal plane, the latter being significantly easier for younger children to manage. The investigations may be performed with or without a control. When conditions are such that the solar radiation reaching the experimental site varies significantly over short time periods a control is preferred, thus reducing the number of samples that can be evaluated in a given amount of time by one half.

In my preferred method for investigating the heat transmitting properties of materials subjected to radiant energy impinging on a horizontal plane, the modified thermal transimeter is set in a horizontal position. While the sun screen 65 is shading the thermometers 68a and 68b and the open chambers 31 and 32 of the thermal transimeter, the ambient air temperature at the top of each chamber is measured. Samples of the materials to be investigated are then set into position and secured by means of the sample holding frames 67a and 67b. The sun screen 65 is then removed. After the test samples have been exposed to direct solar radiation for two minutes, the air temperature directly beneath each sample is noted. The sun screen 65 is replaced, the samples removed, and the air within the chambers 31 and 32 allowed to cool to the ambient air temperature. The procedure is then repeated using two different samples, or one sample in investigations where a standard material is being used as a control. To investigate the heat transmitting properties of materials subjected to normal incident solar radiation, the same procedures are followed while using the angular displacement block 64 and the collimating guide rod 63 to maintain the proper orientation of the thermal transimeter 30 with respect to the incident solar radiation. In both operational modes the temperature increases measured directly beneath the surface of the test samples after two minutes of exposure to solar radiation are used as a basis for evaluating the heat transmitting properties of the test samples.

The basic thermal transimeter with the modifications just described may be used to investigate a wide range of factors which effect heat absorption and transmittance by material subjected to direct solar radiation, such as the color, surface texture, and composition of such materials as paper and paper products, plastics, soils, roofing materials, and synthetic and natural fabrics.

Figures 11, 12, 13, 14, 15:
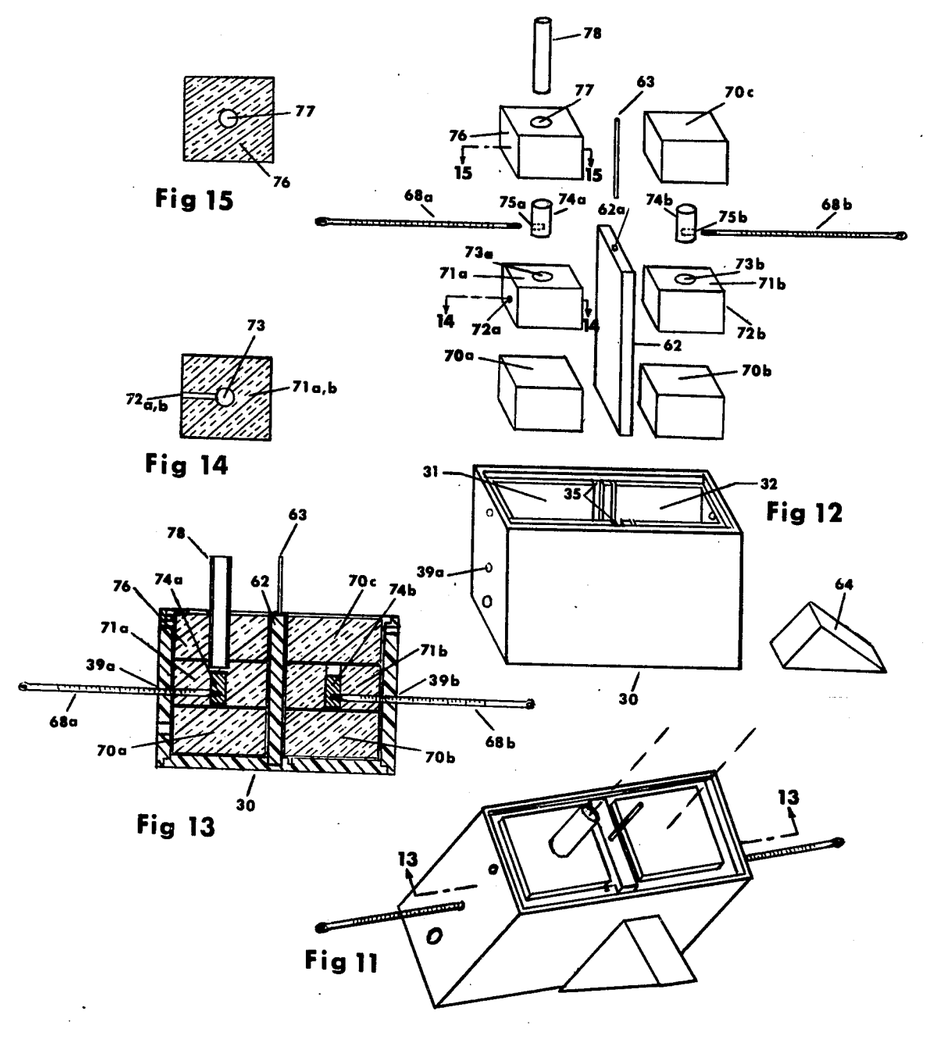
FIG. 11 is a perspective view of my thermal transimeter unit modified to measure the intensity of solar beam radiation at the earth's surface.
FIG. 12 is a perspective view of my basic thermal transimeter unit with the accessory components utilized in the modification illustrated in FIG. 11 shown separated in vertically exploded relation.
FIG. 13 is a cross sectional view taken along section line 13—13 of FIG. 11.
FIG. 14 is a cross sectional view of the sample holding insulating block of my thermal transimeter taken along section line 14—14 of FIG. 12.
FIG. 15 is a cross sectional view of the collimating tube-holding insulating block of my thermal transimeter taken along section line 15—15 of FIG. 12.

FIG. 11 is a perspective view of the basic thermal transimeter unit 30 modified to measure the intensity of solar beam radiation at the earth's surface. The basic thermal transimeter and the accessory components utilized in the modification are shown separated in vertically exploded relation in FIG. 12. When my teaching device is used to measure the intensity of solar beam radiation, the rigid thermal barrier 62 is inserted into the center channel 35 of the basic thermal transimeter as a partition forming two identical chambers, the variable chamber 31 and the control chamber 32. Insulating means for filling the identical chambers are received in removable relation within the chambers and include a pair of rectangular insulating blocks 70a and 70b adapted to fill the chambers to one third of their height and positioned, one in the variable chamber and one in the control chamber, as shown in FIG. 13.

The insulating means further includes a pair of sample holding insulating blocks 71a and 71b, with outer dimensions substantially identical to the solid insulation blocks 70a and 70b, and which are stacked on top of the solid insulation blocks 70a and 70b in the middle positions of the variable chamber and the control chamber respectively, as shown in FIG. 13. The sample holding insulating blocks 71a and 71b have corresponding thermometer insert channels 72a and 72b, best shown in FIG. 14, passing horizontally from one end of each block to geometrically centered, vertically aligned cylindrical apertures 73a and 73b which traverse the thickness of each block. Each aperture has a diameter substantially equal to the diameter of cylindrical metal receiving samples 74a and 74b. The metal receiving samples 74a and 74b are substantially identical in shape and mass and are preferably aluminum with end surfaces painted flat black. The metal receiving samples 74a and 74b have thermometer insert cavities 75a and 75b which are oriented at right angles to the bases thereof and which penetrate two-thirds of the diameter of the receiving sample. The location and orientation of the cavities 75a and 75b is such that they are aligned with the thermometer insert channels 72a and 72b of the sample holding insulating blocks 71a and 71b and with the thermometer insert ports 39a and 39b when the receiving samples have been positioned within the apertures 73a and 73b with their bases flush with the base of the sample holding blocks. Temperature changes which occur within the metal receiving samples 74a and 74b are monitored by use of thermometers 68a and 68b. The thermometers are inserted through the thermometer insert ports 39a and 39b and positioned so that their mercury reservoirs completely fills the thermometer insert cavities 75a and 75b.

A third pair of insulating blocks 76 and 70c having outside dimensions substantially identical to the solid insulating blocks 70a and 70b are stacked on top of the sample holding insulating blocks 71a and 71b, thereby filling the chambers 31 and 32 to their tops, as shown in FIG. 13. The insulating block 76 positioned in the variable chamber 31 has a geometrically centered, vertically aligned, cylindrical aperture 77 having a diameter substantially equal to the diameter of the collimating tube 78. The collimating tube 78 is inserted part way through the aperture in the insulating block 76 with the lower end of the collimating tube 78 close to but not in physical contact with the top surface of the metal receiving sample 74a contained within the variable chamber sample holding insulating block 71a. This arrangement is best shown in FIG. 13. The solid insulating block 70c, placed in the top position of the control chamber 32, is identical to the solid insulating blocks 70a and 70b located in the bottom position of the stack. A means for orienting my teaching device, such as the collimating guide rod 63 previously described, is used in conjunction with the angular displacement block 64 to maintain the desired orientation of the thermal transimeter while measuring incident beam solar radiation.

My preferred method for measuring the intensity of incident beam solar radiation is to monitor normal incident radiation for ten minutes and record the temperature changes in each receiving sample. Proper orientation with respect to the incident beam radiation is maintained by adjusting the position of the thermal transimeter until the shadow cast by the collimating guide rod disappears. It is necessary to readjust the position of the thermal transimeter about once each minute throughout the measuring period in order to compensate for the earth's rotation. The average intensity of solar beam radiation for the duration of the measuring period is reflected by the difference between the temperature changes in the two receiving samples.

Figures 16, 17, 18, 19:
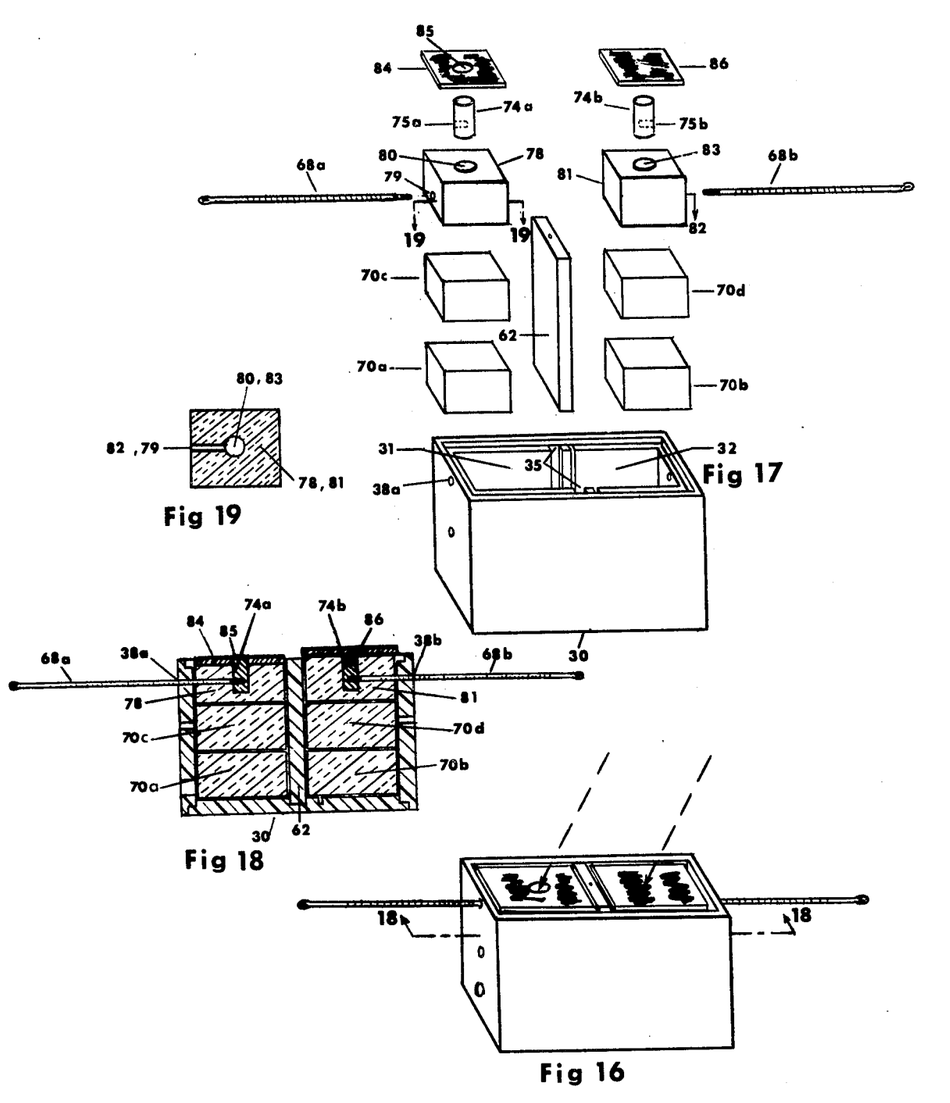
FIG. 16 is a perspective view of my thermal transimeter modified to measure the intensity of total beam plus scattered solar radiation at the earth's surface.
FIG. 17 is a perspective view of the basic thermal transimeter unit with the accessory components utilized in the modification illustrated in FIG. 16 shown separated in vertically exploded relation.
FIG. 18 is a cross sectional view taken along section line 18—18 of FIG. 16.
FIG. 19 is a top sectional view taken along section line 19—19 of FIG. 17 of the sample holding insulating blocks of my thermal transimeter.

FIG. 16 is a perspective view of the basic thermal transimeter unit 30 modified to measure the intensity of total beam plus scattered solar radiation at the earth's surface. The basic thermal transimeter and the accessory components utilized in this modification are shown in vertically exploded relation in FIG. 17. When the thermal transimeter is used to measure the intensity of total beam plus scattered solar radiation, the rigid thermal barrier 62 is inserted into the center channel 35 of the basic thermal transimeter unit as a partition thereby forming two substantially identical chambers, the variable chamber 31 and the control chamber 32. Four substantially identical rectangular insulating blocks 70a–d, each adapted to fill one-third of the height of one of the chambers, are stacked in pairs, two in the variable chamber and two in the control chamber as shown in FIG. 18.

A variable sample holding insulating block 78 having the same base dimensions as the bottom of the variable chamber 31 is stacked on top of the pair of identical insulating blocks placed in the variable chamber. A thermometer insert channel 79, best shown in FIG. 19, passes horizontally from one end of the insulating block 78 to a geometrically centered, vertically aligned cylindrical aperture 80. The aperture has a diameter substantially equal to the diameter of the cylindrical metal receiving samples 74a and b. The thickness of the variable sample holding insulating block 78 is such that the top of the metal receiving sample 74a extends slightly above the top surface of the variable sample holding insulating block, preferably about 2mm above. The location of the thermometer insert channel 79 is such that when the metal receiving sample 74a is in place, its thermometer insert cavity 75a is parallel to and aligned with the thermometer insert channel 79 and the upper thermometer insert port 38a of the basic thermal transimeter unit 30. Thus it is possible to insert thermometer 68a, as shown in FIG. 18. The top surface of the variable sample holding insulating block 78 is covered with a variable chamber reflecting cover plate 84. The reflecting cover plate 84 has a reflecting upper surface and a circular aperture 85 of diameter substantially equal to that of the cylindrical metal receiving sample 74a. The thickness of the cover plate is such that the exposed top surface of the metal receiving sample 74a is flush with the upper surface of the cover plate 84 when the cover plate is in place.

A control sample holding insulating block 81 is stacked on top of the pair of identical insulating blocks 70b and 70d placed in the control chamber 32. The control sample holding block 81 is generally identical to the variable sample holding block 78 except that it is somewhat thicker, typically 2mm thicker. As a result, the upper surface of the control sample holding insulating block is flush with the top surface of the metal receiving sample 74b when the sample is in place. The thermometer insert channel 82 of the control sample holding insulating block is parallel to and aligned with both the sample's thermometer insert cavity 75b and the upper thermometer insert port 38b of the basic thermal transimeter unit 30. Thus it is possible to insert thermometer 68b, as shown in FIG. 18. The upper surfaces of the metal receiving sample 74b and the control sample holding insulating block 81 are covered with a reflecting cover plate 86 substantially identical in size and composition to the reflecting cover plate 84.

The thermal transimeter, modified as just described, may be used to measure total incident solar radiation in a horizontal plane, a plane perpendicular to the beam portion of the total incident solar radiation, or at any intermediate angle. The preferred procedure for measurement in all cases is to expose the upper surfaces of the modified thermal transimeter to solar radiation for 10 minutes, noting the temperature of each metal receiving sample after each minute of the exposure period. The difference between the temperature changes in the two receiving samples reflects the average intensity of total incident solar radiation for the duration of the measuring period.

Figures 20, 21, 22, 23, 24:
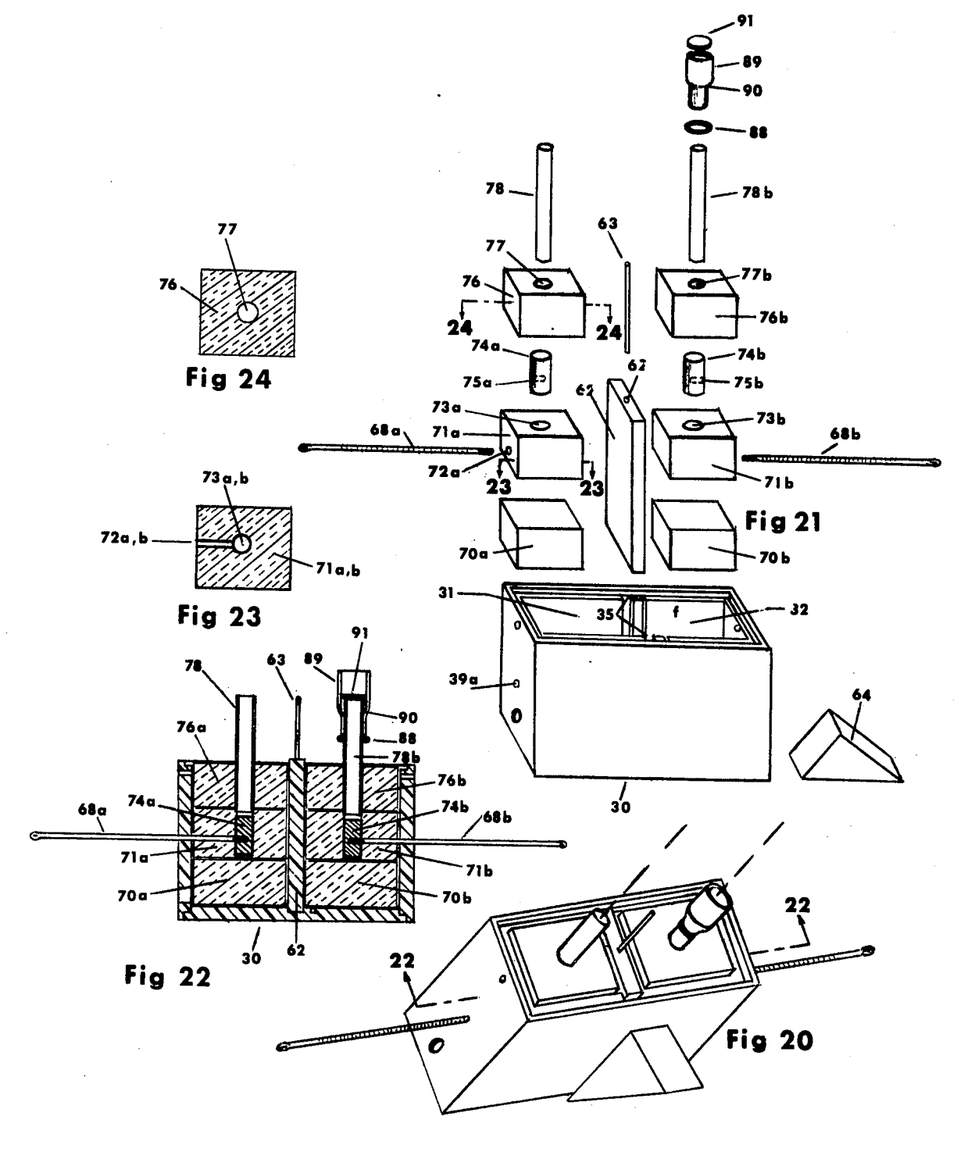
FIG. 20 is a perspective view of my thermal transimeter modified for measuring coefficients of transmittance of solar radiation by various materials.
FIG. 21 is a perspective view of the basic thermal transimeter unit with the accessory components utilized in the modification illustrated in FIG. 20 shown separated in vertically exploded relation.
FIG. 22 is a cross sectional view taken along section line 22—22 of FIG. 20.
FIG. 23 is a sectional view taken along the line 23—23 in FIG. 21 of my sample holding insulating block.
FIG. 24 is a sectional view taken along the line 24—24 in FIG. 21 of my collimating tube holding insulating block.

FIG. 20 is a perspective view of the basic thermal transimeter unit 30 modified to measure coefficients of transmittance of solar radiation by various materials. The basic thermal transimeter and the accessory components utilized in the modification are shown separated in vertically exploded relation in FIG. 21. When my teaching device is used to measure coefficients of transmittance of solar radiation by various materials, the rigid thermal barrier 62 is inserted into the center channel 35 of the basic thermal transimeter unit as a partition thereby forming two identical chambers, the control chamber 31 and the variable chamber 32. A pair of substantially identical rectangular insulating blocks 70a and 70b adapted to fill the identical control and variable chambers to one-third of their heights are positioned in the control and variable chambers respectively as shown in FIG. 22.

The control sample holding insulating block 71a and variable sample holding insulating block 71b described above are stacked on top of blocks 70a and 70b respectively in the middle position of the control and variable chambers 31 and 32, as shown in FIG. 22. When the receiving samples 74a and 74b are in place in the vertical apertures of the sample holding insulating blocks 71a and 71b, the thermometer insert cavities 75a and 75b are aligned with and parallel to the thermometer insert channels 72a and 72b of the sample holding insulating blocks 71a and 71b and with the thermometer insert ports 39a and 39b. Consequently, thermometers 68a and 68b can be inserted through the thermometer insert ports 39a and 39b and positioned so that their mercury reservoirs completely fill the thermometer insert cavities 75a and 75b of the cylindrical metal receiving samples 74a and 74b, respectively.

A third pair of identical insulating blocks 76 and 76b having the same dimensions as the solid insulating blocks 70a and 70b are stacked one on top of each of the sample holding insulating blocks. These insulating blocks 76 and 76b have identical geometrically centered, vertically aligned cylindrical apertures 77 and 77b, best shown in FIG. 24. The diameter of the apertures is substantially equal to the diameter of the collimating tubes 78 and 78b. The collimating tubes are inserted through the apertures 77 and 77b to the extent that, when the insulating blocks are stacked in the top position of the control and variable chambers 31 and 32, the lower end of the collimating tubes are close to but not in physical contact with the blackened top surface of the cylindrical metal receiving samples 74a and 74b, as shown in FIG. 22. A means for holding a sample of selected material over the end of the collimating tube 78b comprises a sample holder support ring 88 slipped onto the collimating tube 78b when the collimating tube is in place, and adjusted to support the sample holder 89 so that the expanded vertical section 90 of the sample holder is held slightly below the top end of the collimating tube. Disc shaped samples 91 of the materials to be investigated, having a diameter slightly less than the interior diameter of the expanded section of the sample holder 89, are dropped into the sample holder 89 and supported by the top edge of the collimating tube 78b.

A means for orienting my teaching device, such as the collimating guide rod 63 is used in conjunction with the angular displacement block 64 to establish and maintain the orientation of the modified thermal transimeter unit such that the incident beam radiation is parallel to the collimating tubes 78 and 78b and therefore perpendicular to the surface of the sample discs 91. The arrangement is shown in FIG. 20. With the thermal transimeter unit so oriented, the metal receiving sample contained in the control chamber is exposed to normal incident solar radiation for the same period that the surface of the metal receiving sample in the variable chamber is exposed to that portion of the incident solar radiation which is transmitted by the sample material held by the sample holder 89. The temperature difference between the metal receiving samples produced during a specified time of exposure indicates the difference between the incident solar radiation reaching the surface of the sample material and that which is transmitted by that material to the surface of the variable chamber receiving sample and absorbed.

My preferred method for using the thermal transimeter modified to measure coefficients of transmittance of solar radiation by various materials is to assemble the various components utilized in the modified thermal transimeter in an area that is shaded from direct solar radiation. It is preferred that the initial temperature of the control and variable receiving samples be at or near the ambient air temperature. With the modified thermal transimeter properly oriented with respect to the incident beam radiation, the surfaces of the receiving samples are exposed for ten minutes and the final temperatures are compared.

The basic thermal transimeter modified for measuring coefficients of transmittance can be used to investigate a number of phenomena related to transmittance, such as the relationship between the color of a specific material and its coefficient of transmittance, the relationship between the thickness of a specific material and its coefficient of transmittance, and differences of coefficient of transmittance of different materials having the same thickness.

It is envisioned that my basic thermal transimeter will be provided as a kit including all the components necessary for the heat flow demonstration, as shown in FIGS. 1–5, and one or more sets of insulating blocks, metal receiving samples and the other components necessary to conduct some or all of the demonstrations shown in FIGS. 6–24. By providing the thermal transimeter as such a kit with extra accessories, great flexibility for demonstrations is maintained and individual initiative by students in trying new experiments is encouraged.

It is understood that the present invention is not confined to the particular steps, construction or arrangement of parts herein illustrated and described, but embraces all such modified forms thereof as may come within the scope of the following claims.

I claim:

1. A teaching device for the comparative measurement of heat flow, comprising an open-topped container constructed of relatively low heat conductive material having means for locating an internal partition, at least one partition of selected heat conductivity engageable with the partition locating means in removable relation to divide the container into a variable chamber and a substantially identical control chamber, means for measuring the temperature within each of the identical chambers, and cover means for selectively closing the chambers whereby the device may be used to selectively measure heat flow into and between the identical chambers.

2. The teaching device recited in claim 1 wherein the means for measuring the temperature within each of the identical chambers comprises at least one thermometer, and wherein the container includes at least one thermometer insert port extending through the wall of the container in communication with the interior of each chamber, each insert port being adapted to receive and position the thermometer to indicate the interior temperature of the chamber.

3. The teaching device recited in claim 1 wherein the means for measuring the temperature within each of the identical chambers comprises at least one thermometer, and wherein the cover means includes at least one thermometer insert port extending through the cover means in communication with the interior of each chamber when the cover means is closed, each insert port being adapted to receive and position the thermometer to indicate the interior temperature of the chamber.

4. The teaching device recited in claim 1 wherein the cover means is constructed of relatively low heat conductive material and combines with the partition to prevent communication between the two chambers, and wherein means for heating one of the chambers is located within the chamber when the cover is closed whereby by monitoring the temperature changes in the two identical chambers the heat transmitting properties of the partition may be measured.

5. The teaching device recited in claim 4 wherein the partition comprises means for positioning a sample of material between the two chambers whereby the relative heat transmitting properties of the sample material may be measured.

6. The teaching device recited in claim 5 wherein the means for positioning a sample comprises two, rigid, parallel grids and a frame engaging the two, rigid grids in spaced relation and substantially closing the margins of the space between them to retain a nonrigid, solid sample therebetween.

7. The teaching device recited in claim 5 wherein the means for positioning a sample comprises two rigid, fluid-impermeable, parallel sides and a frame engaging the two sides in spaced relation and substantially closing the margins of the space between them to retain a fluid sample therebetween.

8. The teaching device recited in claim 1 including means for covering the open tops of the two chambers with sample materials of selected heat transmitting properties, a sun screen to selectively shade the device from the direct rays of the sun, and means for indicating the orientation of the tops of the chambers relative to the rays of the sun whereby the relative heat transmitting properties of the sample materials in response to direct solar radiation may be determined.

9. The teaching device of claim 8 wherein the means for covering the open tops of the two chambers with sample materials comprises:
   (a) at least one sample holding frame for removable engagement with the top edges of the walls of each chamber to selectively define the effective margins of the open top of each chamber, the frame being further adapted to engage and retain panels of rigid sample materials extending across the open top of the chamber, and (b) at least one fabric sample holder nestable within the inside surface of the sample holding frame to engage a fabric sample between the sample holding frame and the fabric sample holder whereby the fabric sample will extend across the open top of the chamber.

10. The teaching device recited in claim 1 including insulating means for filling the variable chamber and control chamber, each insulating means being adapted to hold a receiving sample in fixed position within the chamber; a collimating tube locatable within the insulating means of the variable chamber to allow a receiving sample in that chamber to be exposed to the parallel rays of the sun while being screened from most scattered solar radiation; and wherein the means for measuring the temperature within each of the identical chambers may be so located as to independently measure the temperature of each receiving sample whereby the effect of direct solar beam radiation may be observed.

11. The teaching device recited in claim 10 including a second collimating tube which may be oriented parallel to the axis of the collimating tube of the variable chamber and located in the insulating means of the control chamber so as to allow a receiving sample in the control chamber to be exposed to the parallel rays of the sun while being screened from most scattered solar radiation, and means for holding a sample of selected material to be tested over the end of the collimating tube of the variable chamber whereby the temperature changes in the two receiving samples will indicate the heat transmitting properties of the sample material.

12. The teaching device recited in claim 1 including insulating means for filling the variable chamber and the control chamber, means within the insulating means for holding receiving samples, and a reflecting cover plate for covering the top surface of each insulating means when placed within each respective chamber, the reflecting cover plate for the variable chamber having an aperture which extends therethrough to permit a receiving sample held by the holding means to be positioned flush with the upper surface of the reflecting cover plate.

13. A method for teaching the comparative measurement of heat flow which comprises:
   (a) placing a first receiving sample into a first insulating means in the first chamber of an open topped container having means for locating an internal partition wherein a partition is engaged to divide the container into identical chambers,
   (b) placing a second identical receiving sample in a second identical insulating means in a second identical chamber of the container,
   (c) selectively exposing the receiving samples to a source of radiant energy, and
   (d) measuring the temperature changes in the receiving samples to determine the relative heat flow to each receiving sample.

14. The method for teaching the comparative measurement of heat flow recited in claim 13 wherein the step of selectively exposing the receiving samples to a source of radiant energy comprises:
   (a) placing a collimating tube in the first insulating means whereby an area of the surface of the first receiving sample may be exposed to the parallel rays of the sun, while being screened from most scattered solar radiation,
   (b) orienting the container so that the axis of the collimating tube is parallel to the rays of the sun, and
   (c) exposing the container and its contents to the rays of the sun whereby the effect of direct solar beam radiation on the temperature of the exposed sample may be observed.

15. The method for teaching the comparative measurement of heat flow recited in claim 13 wherein the step of selectively exposing the receiving samples to a source of radiant energy comprises:
   (a) covering the first insulating means with a first reflecting cover plate which contains a circular aperture substantially identical in cross section to the end of the first receiving sample,
   (b) holding the first receiving sample in the first insulating means so that the end of the receiving sample extends through the circular aperature and is flush with the top surface of the first reflecting cover plate,
   (c) covering a second insulating means with a second reflecting cover plate,
   (d) holding a second identical receiving sample in the second insulating means so that the top surface of the second receiving sample is flush with the under side of the second reflecting cover plate but is otherwise in a location that corresponds to that of the first receiving sample, and
   (e) exposing the container and its contents at a selected angle to the rays of the sun whereby the effect of direct solar radiation on the exposed sample may be observed.

16. The method for teaching the comparative measurement of heat flow recited in claim 13 wherein the step of selectively exposing the receiving samples to a source of radiant energy comprises:
   (a) placing identical collimating tubes in parallel orientation to each other in the first and the second insulating means whereby the first and the second receiving sample may be exposed to the parallel rays of the sun while being screened from most scattered solar radiation,
   (b) completely covering the end of the first collimating tube with a sample of material to be studied, and
   (c) exposing the container and its contents at a selected angle to the rays of the sun whereby the temperature changes in the two receiving samples will indicate the heat transmitting properties of the sample material.

17. A method for teaching the comparative measurement of the heat transmitting properties of materials comprising:
   (a) holding a first sample so that it completely covers the open top of a first chamber of a container constructed of material of relatively low heat conductivity and having a plurality of identical, open-topped chambers,
   (b) holding at least one other sample so that it completely covers the open top of another identical chamber of the container,
   (c) exposing the container and its contents at a selected angle to the rays of the sun, and
   (d) measuring the temperature changes within the identical chambers whereby the relative heat transmitting properties of the sample materials in response to direct solar radiation may be observed.

18. A method for teaching the measurement of the heat transmitting properties of materials comprising:
   (a) locating a partition substantially composed of the material to be studied inside a covered container constructed of material of relatively low heat conductivity so that the container is divided by the partition into two noncommunicating chambers,
   (b) locating a heat source in one of the chambers, and
   (c) measuring the temperature rise in both chambers whereby the heat transmitting properties of the material of which the partition is composed may be measured.

19. An educational kit for teaching the characteristics of heat flow comprising:
   (a) a rectangular box including two sides, two end walls and a base, the box having partition receiving means formed therein to receive a partition parallel to and midway between the end walls, the box also having insert ports formed therein, each adapted to receive a thermometer therethrough,
   (b) closure means to close the top of the box, the closure means also having insert ports formed therein, (c) heating means positioned in the box on a first side of the partition receiving means, (d) a pair of thermometers adapted to be inserted through a pair of the insert ports so as to be positioned on opposite sides of the partition receiving means, and (e) a set of partitions of varying heat transmissivity, each adapted to be selectively inserted into the partition receiving means in the box to thermally partition the box into two chambers.

20. An educational kit as claimed in claim 19 wherein the kit further includes a set of insulating blocks adapted to be received in the chambers in the box, at least two of the blocks having vertically aligned cylindrical apertures and thermometer insert channels formed in them, and a pair of metal receiving samples adapted to be received in the cylindrical apertures in the insulating blocks.

21. An educational kit as claimed in claim 20 wherein the kit further includes at least one collimating tube supportable by one of the insulating blocks and adapted to transmit direct sunlight to one of the metal receiving samples.

22. An educational kit as claimed in claim 19 wherein the kit further includes, (a) at least one sample holding frame adapted to position materials of varying heat transmissivity across the tops of at least one of the chambers, and (b) a sun screen to selectively shade the box and samples from direct solar radiation.

23. An educational kit as claimed in claim 19 including a collimating guide means for orienting the position of the box relative to incident solar radiation.

* * * * *